L. C. MEYER.
POT SCRAPER.
APPLICATION FILED JULY 28, 1911.
1,018,844.
Patented Feb. 27, 1912.
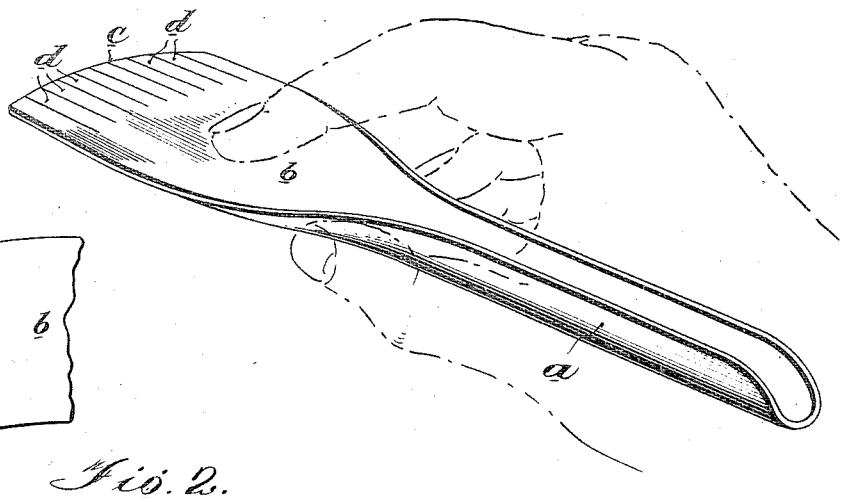
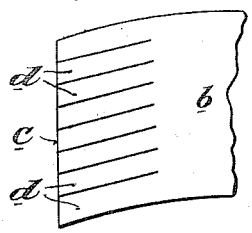
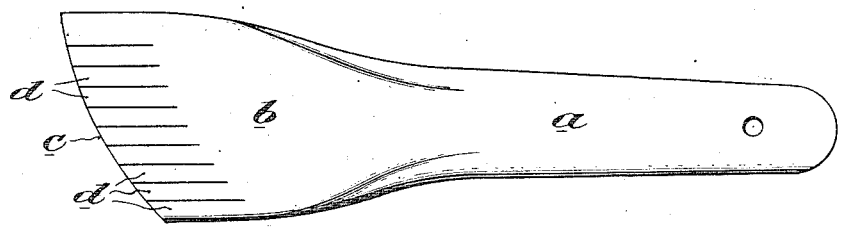
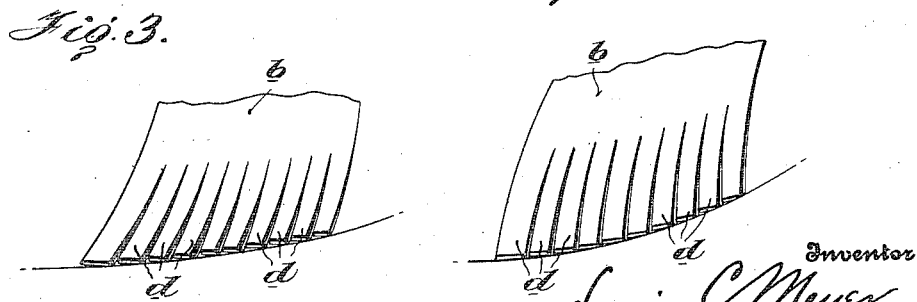
Inventor
Louis C. Meyer
By Davis & Davis
Attorneys
Witnesses:

UNITED STATES PATENT OFFICE.

LOUIS C. MEYER, OF DAVENPORT, IOWA.

POT-SCRAPER.

1,018,844.　　　　Specification of Letters Patent.　　Patented Feb. 27, 1912.

Application filed July 28, 1911. Serial No. 641,179.

*To all whom it may concern:*

Be it known that I, LOUIS C. MEYER, a citizen of the United States, and a resident of Davenport, county of Scott, and State of Iowa, have invented certain new and useful Improvements in Pot-Scrapers, of which the following is a full and clear specification, reference being had to the accompanying drawings, in which—

Figure 1 is a perspective view of my improved scraper showing the most effective manner in which it may be grasped while in use; Fig. 2 is a bottom view of the scraper; Figs. 3 and 4 are detail views showing the manner of flexing the scraping portion of the device when operating on curved surfaces; and Fig. 5 a detail plan view of a modified form of scraping edge.

The object of this invention is to provide a simple scraping tool which shall be so constructed as to be especially efficient in scraping concave surfaces such as are found in pots and kettles, as more fully hereinafter set forth.

I prefer constructing the device out of a thin plate of steel whose side edges are curved upwardly and toward each other the greater part of the length of the plate to form, in a simple manner, a handle $a$, the other end of the plate being left substantially flat to form the scraper blade $b$. In the form of device shown in Figs. 1 to 4 inclusive the scraping edge $c$ is convexly curved and extended diagonally across the blade $b$, thereby giving the blade a slightly tapered shape in plan view. The scraping, or forward portion of the blade $b$ is slitted longitudinally, the slits running from the scraping edge back into the blade a suitable distance, thus converting the scraping portion of the blade into a series of thin resilient fingers $d$, which are closely adjacent to each other and preferably abut against each other along their longitudinal edges.

In using this device it is preferably grasped as shown in Fig. 1, with the thumb and second finger clasping the shoulders formed by bending up the plate and with the fore finger bearing approximately at the middle of the upper face of the scraping blade. When thus grasped in the hand it is easy to apply the desired pressure and to twist the scraping blade in either direction as may be desired in scraping surfaces of varying curvature. When pressure of the fore finger is directly downward on the blade and the blade is working on a flat surface, the fingers remain close together and the scraping edge acts as any other continuous scraping edge, but when operating upon concave surfaces the action of the scraper is essentially different from the ordinary type of scraper. In scraping these concave surfaces the operator presses the scraping blade against the surface and at the same time slightly twists the handle in one direction or the other according to the direction of curvature of the surface. When the blade is thus pressed against the surface and twisted the fingers are caused to slightly separate at their outer ends so that as they flatten against the surface being scraped they present the outer portions of their side edges to the surface and thus greatly increase the effective scraping capacity of the tool. When thus twisted and flexed the side edges of the fingers not only operate as independent scraping edges but the scraping edge $c$ proper of the tool continues to perform its function though this scraping edge proper is of course broken up into a series of short edges; and although the fingers become slightly separated when the tool is thus twisted they nevertheless abut against each other at their inner portions and thus serve to brace or sustain each other, whereby they are prevented from being permanently bent out of position. When thus pressed hard against the concave surface being scraped, it will be seen that these fingers really become independently operative so that each finger has a certain degree of independent adjustability to the surface being scraped.

I prefer that the main scraping edge $c$ of the tool shall extend diagonally across the blade to thus give to the blade a forwardly tapering outline, whereby the blade is more readily flexed to the degree necessary to conform to the convexity of the surface being cleaned. It is within this invention however to have the main scraping edge extend transversely of the tool, as shown in Fig. 5, but in this case it is desirable and possibly necessary in order to get the full efficiency within the capacity of the tool to have the slits extend obliquely from this edge. In the form shown in the other figures the slits also stand in a diagonal relation to the main scraping edge, and in both forms of the tool this diagonal relation of the slits to the main scraping edge enables the scraping edges of the fingers to be brought into action with the least twisting action or motion of the tool. It must be understood that it is not essential that the fingers shall closely abut on their meeting edges but simply that they shall lie sufficiently close together at their points of connection with the main plate to render each finger more capable of withstanding lateral strains than it would be if it were standing alone.

It will be understood that this invention is not confined to the specific construction shown and described since the principle thereof may be carried out by various modifications.

Having thus described my invention, what I claim as new and desire to secure by Letters Patent, is—

1. In a tool of the class described, the combination of a handle and a scraper blade, the latter consisting of a thin flexible sheet of metal having a main scraping edge, said blade being provided with a plurality of slits running back from the scraping edge, thus forming a series of independently yieldable fingers arranged closely adjacent.

2. A scraper for pots, etc., consisting of a handle and a thin flexible metal scraping blade having a main scraping edge extending diagonally across the blade, this scraping edge being divided up into a series of independently flexible fingers by a series of slits running back from the edge at an oblique angle to said edge.

3. A scraper for pots, etc., consisting of a handle and a thin flexible metal scraping blade having a main scraping edge extending diagonally across the blade, said main scraping edge being convexly curved, this scraping edge being divided up into a series of independently flexible fingers by a series of slits running back from the edge at an oblique angle to said edge.

In testimony whereof I hereunto affix my signature in the presence of two witnesses.

LOUIS C. MEYER.

Witnesses:
 NOLA M. DELLETT,
 R. B. NEWTON.